US012125374B2

(12) United States Patent
Kashimura et al.

(10) Patent No.: US 12,125,374 B2
(45) Date of Patent: Oct. 22, 2024

(54) PEDESTRIAN SAFETY INSTRUCTION DEVICE AND METHOD

(71) Applicant: TOYOTA JIDOSHA KABUSHIKI KAISHA, Toyota (JP)

(72) Inventors: Takashi Kashimura, Nagoya (JP); Takahiro Kato, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 51 days.

(21) Appl. No.: 18/150,033

(22) Filed: Jan. 4, 2023

(65) Prior Publication Data

US 2023/0290244 A1  Sep. 14, 2023

(30) Foreign Application Priority Data

Mar. 11, 2022  (JP) .................. 2022-038585

(51) Int. Cl.
*G08G 1/005* (2006.01)
(52) U.S. Cl.
CPC .................. *G08G 1/005* (2013.01)
(58) Field of Classification Search
CPC .................. G08G 1/005
See application file for complete search history.

(56) References Cited

U.S. PATENT DOCUMENTS

| 5,470,233 | A  | * | 11/1995 | Fruchterman | ........... | G01S 19/14 |
| | | | | | | 340/8.1 |
| 9,286,794 | B2 | * | 3/2016  | Duncan      | ................. | G02B 27/017 |
| 9,349,293 | B2 | * | 5/2016  | Beaurepaire | ........... | G08G 1/166 |
| 2016/0351049 | A1 | | 12/2016 | Hamada et al. | | |
| 2019/0103018 | A1 | | 4/2019  | Tanabe et al. | | |
| 2023/0343208 | A1 | * | 10/2023 | Ueno        | ....................... | A61H 3/06 |

FOREIGN PATENT DOCUMENTS

| JP | 2017211915 A  | 11/2017 |
| WO | 2015122406 A1 | 8/2015  |
| WO | 2019240070 A1 | 12/2019 |

* cited by examiner

*Primary Examiner* — John A Tweel, Jr.
(74) *Attorney, Agent, or Firm* — Hunton Andrews Kurth LLP

(57) ABSTRACT

Provided is an information processing device including a control unit that determines a moving method of a first user, outputs a first instruction to present a first notification for prompting the first user to perform a safety action, when both a first condition and a second condition are satisfied, and avoids outputting the first instruction when at least one of the first condition and the second condition is not satisfied. The first condition is a condition that the first user is not on a passenger vehicle.

20 Claims, 9 Drawing Sheets

PEDESTRIAN SAFETY INSTRUCTION DEVICE AND METHOD

CROSS-REFERENCE TO RELATED APPLICATION

This application claims priority to Japanese Patent Application No. 2022-038585 filed on Mar. 11, 2022, incorporated herein by reference in its entirety.

BACKGROUND

1. Technical Field

The present disclosure relates to an information processing device, a method, and a storage medium.

2. Description of Related Art

Technology related to traffic safety education is conventionally known. For example, WO 2019/240070 discloses technology for determining that a predetermined operation has been performed based on the operation of a moving person.

SUMMARY

There was room for improvement in the technology related to traffic safety education.

An object of the present disclosure, made in view of such circumstances, is to improve the technology related to traffic safety education.

An information processing device according to an embodiment of the present disclosure is an information processing device including a control unit. The control unit determines a moving method of a first user, outputs a first instruction to present a first notification for prompting the first user to perform a safety action, when both a first condition and a second condition are satisfied, and avoids outputting the first instruction when at least one of the first condition and the second condition is not satisfied. The first condition is a condition that the first user is not on a passenger vehicle.

A method according to an embodiment of the present disclosure is a method executed by an information processing device. The method includes: determining a moving method of a first user; outputting a first instruction to present a first notification for prompting the first user to perform a safety action, when both a first condition and a second condition are satisfied; and avoiding outputting the first instruction when at least one of the first condition and the second condition is not satisfied. The first condition is a condition that the first user is not on a passenger vehicle.

In a storage medium storing a program according to an embodiment of the present disclosure, the program causes an information processing device to execute: determining a moving method of a first user; outputting a first instruction to present a first notification for prompting the first user to perform a safety action, when both a first condition and a second condition are satisfied; and avoiding outputting the first instruction when at least one of the first condition and the second condition is not satisfied. The first condition is a condition that the first user is not on a passenger vehicle.

According to the embodiment of the present disclosure, the technology related to traffic safety education is improved.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, an embodiment of the present disclosure will be described.

Outline of Embodiment

Figure 1:
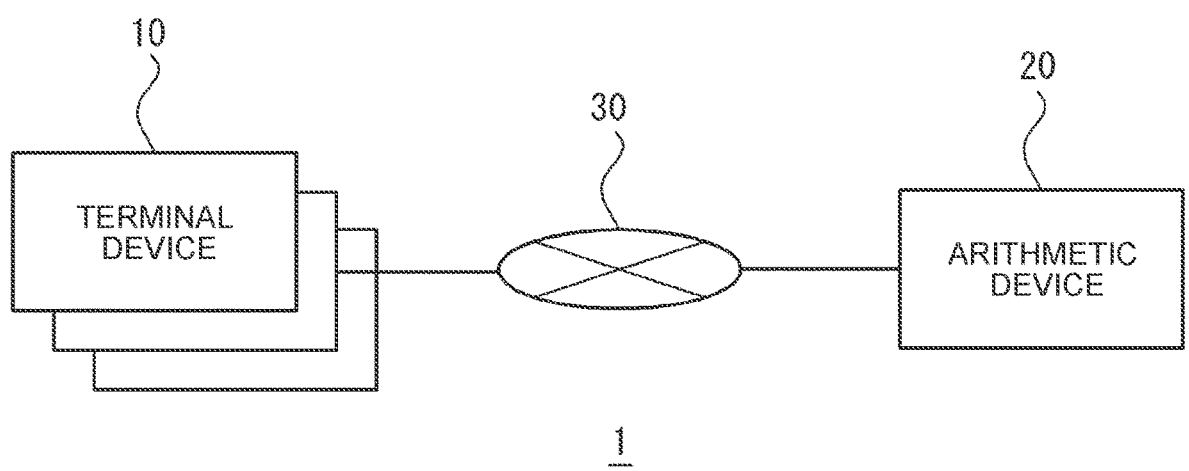
FIG. 1 is a block diagram showing a schematic configuration of a system according to an embodiment of the present disclosure.

The outline of a system 1 according to an embodiment of the present disclosure will be described with reference to FIG. 1. The system 1 includes a terminal device 10 and an arithmetic device 20. The terminal device 10 and the arithmetic device 20 are communicably connected via a network 30 including, for example, the Internet and a mobile communication network.

The terminal device 10 is any information processing device that can be used by a user. For example, as the terminal device 10, a wearable device that the user carries, a general-purpose device such as a smartphone or a personal computer (PC) may be used. A "wearable device" is specifically a mobile device that can be worn at any position on a user's clothing or body, such as a badge type, a wristwatch type, or a clothing type device. In the present embodiment, the terminal device 10 is a badge-type wearable device that is worn at the position on the temporal side of a cap when the cap is worn by the user. However, the present disclosure is not limited to these examples, and any general-purpose device can be mounted at any position. The user of the terminal device 10 is typically a child (e.g., a seven-year-old child) in the present embodiment, but is not limited thereto.

The arithmetic device 20 is any information processing device such as one or a plurality of server devices capable of communicating with each other.

First, the outline of the present embodiment will be described, and the details will be described later. The information processing device according to the present embodiment is the terminal device 10. The terminal device 10 determines the moving means of a first user. The terminal device 10 outputs a first instruction to present a first notification for prompting the first user to perform a safety action when both a first condition and a second condition are satisfied. The "safety action" refers to the action of protecting the first user, and includes, for example, the first user looking both ways before crossing the road. The terminal device 10 does not output the first instruction when at least one of the first condition and the second condition is not satisfied. In the present embodiment, the first condition is that the first user is not on a passenger vehicle. The "passenger vehicle" is a vehicle used for the purpose of passenger transportation, such as a railway vehicle, a tramway train, a route bus, or a taxi. In this specification, the passenger vehicle does not include light vehicles such as bicycles and electric kickboards used as the first user's own moving means. In the following, a bicycle will be described as a representative example of the light vehicle, but it is not intended to exclude other light vehicles. In this specification, passenger vehicles and bicycles are collectively referred to as "vehicles". In the present embodiment, the second condition is that the first user has approached at least one checkpoint of one or more checkpoints. The "checkpoint" refers to a point that can easily cause danger to the first user from the viewpoint of traffic safety, and includes, for example, an intersection or a point of frequent traffic accidents. In other words, the checkpoint is a point where some safety action is required to ensure the safety of the first user. The terminal device 10 acquires position information of the first user. The terminal device 10 determines, based on the position information, whether the first user has approached the at least one checkpoint of the one or more checkpoints.

Thus, according to the present embodiment, only when both the first condition and the second condition are satisfied, the first instruction for presenting the first notification for prompting the first user to perform a safety action is output. Specifically, the first notification is presented that is a voice to prompt a safety action when a first user who is walking or riding a bicycle approaches any checkpoint. In the following, presenting the notification to prompt a safety action is also referred to as "alert". Here, for example, when the first user approaches any checkpoint while the first user is on the passenger vehicle, it is considered that the first user's own safety action is not necessarily necessary. However, conventionally, whether to perform the alert has been determined based only on the position information of the approach to the checkpoint. Therefore, even when the first user is on the passenger vehicle, when the approach to the checkpoint is detected, an alert is performed and the first notification is presented. In other words, the first notification may be presented at an unnecessary timing. Thus, the first user is likely to feel annoyed. On the other hand, according to the present embodiment, since the alert is not performed when the first user is on the passenger vehicle, it is easy to avoid the first notification from being presented at an unnecessary timing. Therefore, it is possible to reduce causing the first user to feel annoyed and to easily maintain the effect of the alert, so that the technology related to traffic safety education is improved.

Next, each configuration of the system 1 will be described in detail.

Configuration of Terminal Device

Figure 2:
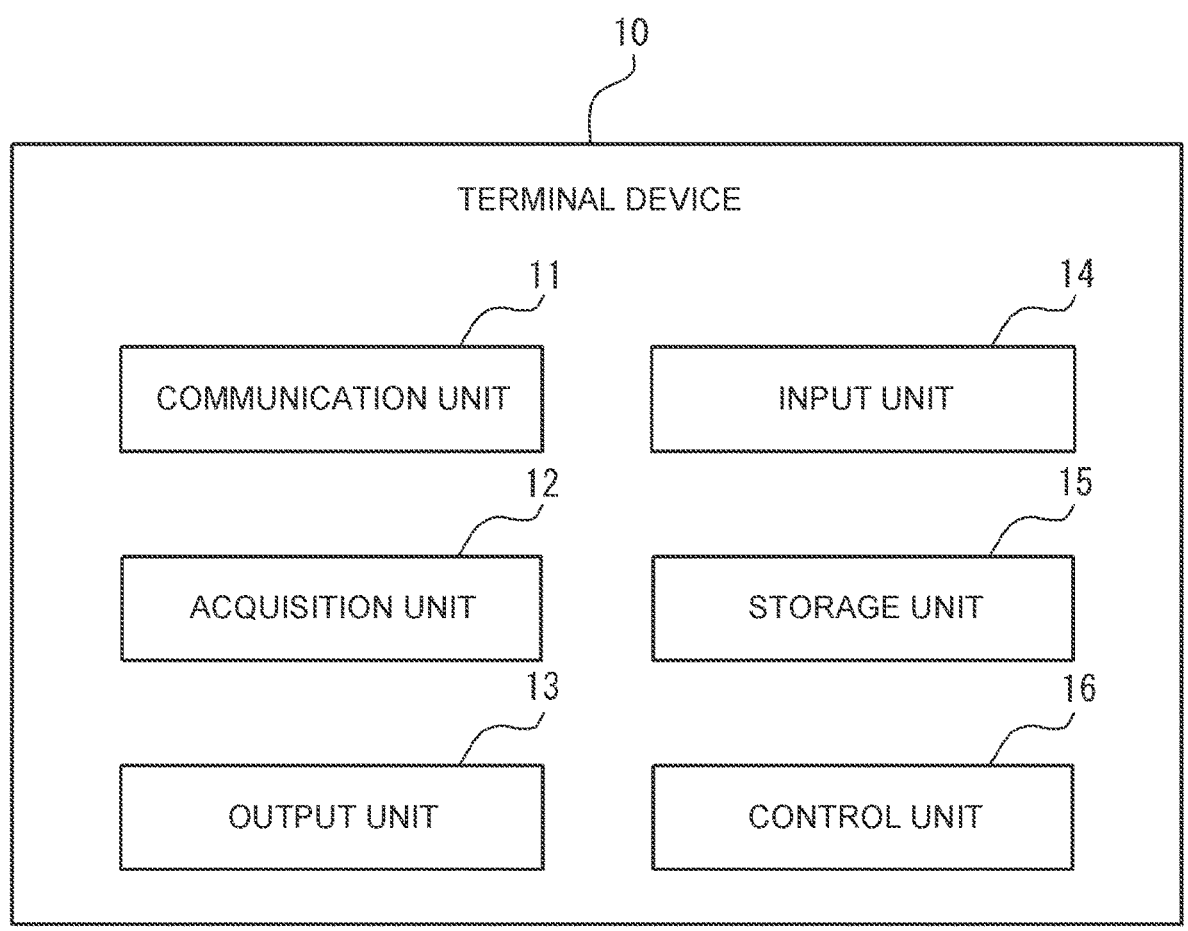
FIG. 2 is a block diagram showing a schematic configuration of a terminal device.

As shown in FIG. 2, the terminal device 10 includes a communication unit 11, an acquisition unit 12, an output unit 13, an input unit 14, a storage unit 15, and a control unit 16.

The communication unit 11 may include one or more communication interfaces connected to the network 30. The communication interface conforms to, for example, a mobile communication standard such as 4th Generation (4G) and 5th Generation (5G), a wired local area network (LAN) standard, or a wireless LAN standard, but is not limited thereto, and may conform to any communication standard. In the present embodiment, the terminal device 10 is connected to the network 30 via the communication unit 11. The terminal device 10 may communicate with, for example, a general-purpose device such as a smartphone or a personal computer (PC) carried by a user (a second user to be described later) different from the user of the terminal device 10 (the first user to be described later) via the communication unit 11 and the network 30.

The acquisition unit 12 includes one or more devices for acquiring the position information of the user of the terminal device 10. Specifically, the acquisition unit 12 includes, for example, a receiver conforming to a global positioning system (GPS), but is not limited thereto, and may include a receiver conforming to any satellite positioning system. The acquisition unit 12 also includes any sensor module capable of acquiring information indicating the behavior of the user holding the terminal device 10. The "behavior of the user" includes, for example, looking both ways, stopping, walking while facing forward in the traveling direction, walking while facing backward in the traveling direction, and running. Specifically, the sensor module includes a camera, an infrared sensor, a velocity sensor, an angular velocity sensor, an acceleration sensor, a geomagnetic sensor, or a combination thereof.

The output unit 13 includes one or more output devices for outputting information and notifying the user. The output device is, for example, a speaker for outputting information by voice, a display for outputting information by video, or a driving device for providing a user with a sensible stimulus such as vibration, but is not limited thereto.

The input unit 14 includes one or more input devices that detect user input. The input device is, for example, a physical key, a capacitance key, a touch screen provided integrally with the display of the output unit 13, a microphone for receiving voice input, a camera, and the like, but is not limited thereto.

The storage unit 15 includes one or more memories. The memories are, for example, a semiconductor memory, a magnetic memory, or an optical memory, but are not limited to these memories. Each memory included in the storage unit 15 may function as, for example, a main storage device, an auxiliary storage device, or a cache memory. The storage unit 15 stores any information used for the operation of the terminal device 10. For example, the storage unit 15 may store system programs, application programs, embedded software, databases, map information, and the like. The information stored in the storage unit 15 may be updatable with information received from the network 30 via the communication unit 11, for example.

In the present embodiment, the storage unit 15 stores a user database and a notification database.

The user database includes user data having "position information", "vehicle flag", and "bicycle flag" for each user.

The "position information" is information indicating the position of the user on the map.

The "vehicle flag" is information indicating whether the user is on a vehicle. ON indicates that the user is on the vehicle, and OFF indicates that the user is not on the vehicle.

The "bicycle flag" is information indicating whether the user is riding a bicycle. ON indicates that the user is riding the bicycle and OFF indicates that the user is not riding the bicycle.

The notification database includes notification data having a "first notification" and a "first notification ID". The notification database may further include notification data having a "second notification", a "second notification ID", a "third notification", and a "third notification ID".

The "first notification" is the data of the notification corresponding to the alert.

The "first notification ID" is information that uniquely identifies the first notification.

The "second notification" is the data of the notification for presenting a positive determination result to the user.

The "second notification ID" is information that uniquely identifies the second notification.

The "third notification" is the data of the notification for presenting a negative determination result to the user.

The "third notification ID" is information that uniquely identifies the third notification.

The control unit 16 includes one or more processors, one or more programmable circuits, one or more dedicated circuits, or a combination of these. The processor is, for example, a general-purpose processor such as a central processing unit (CPU) or a graphics processing unit (GPU), or a dedicated processor specialized for a specific process, but is not limited to these. The programmable circuit is, for example, a field-programmable gate array (FPGA), but is not limited to this. The dedicated circuit is, for example, an application specific integrated circuit (ASIC), but is not limited to this. The control unit 16 controls the operation of the terminal device 10 as a whole. Details of the operation of the terminal device 10 controlled by the control unit 16 will be described later.

Configuration of Arithmetic Device

Figure 3:
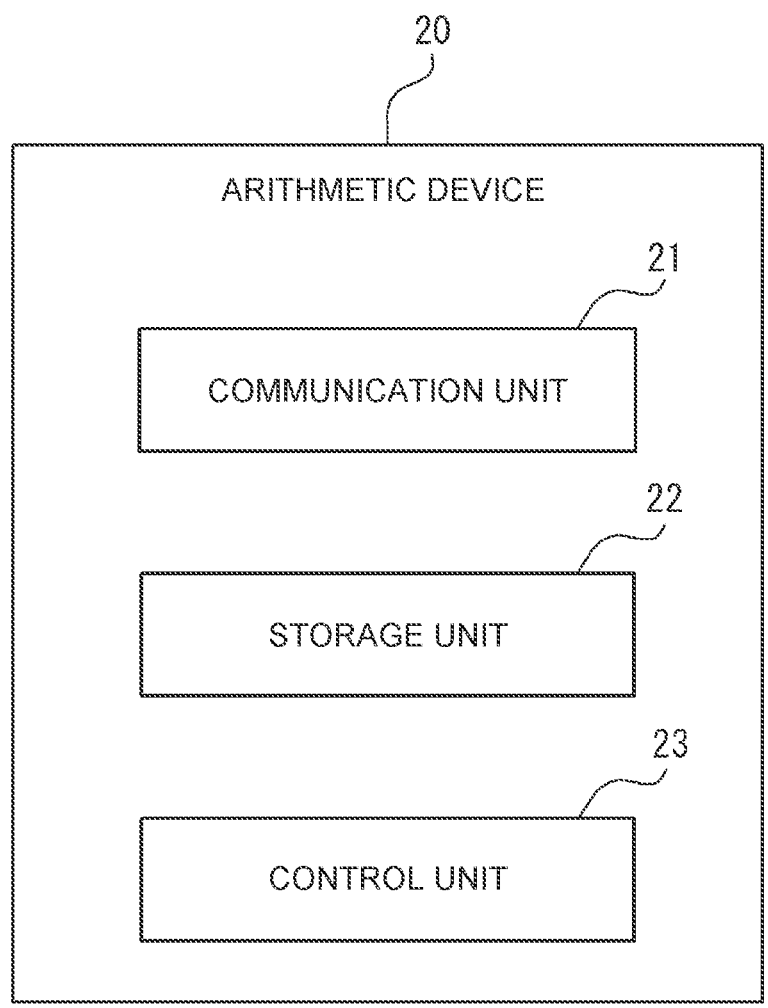
FIG. 3 is a block diagram showing a schematic configuration of an arithmetic device.

As shown in FIG. 3, the arithmetic device 20 includes a communication unit 21, a storage unit 22, and a control unit 23.

The communication unit 21 includes one or more communication interfaces connected to the network 30. The communication interface conforms to, for example, a mobile communication standard, a wired LAN standard, or a wireless LAN standard. However, the standards are not limited to these, and the communication interface may conform to any communication standard. In the present embodiment, the arithmetic device 20 communicates with the terminal device 10 via the communication unit 21 and the network 30. The arithmetic device 20 may communicate with, for example, a general-purpose device such as a smartphone or a PC carried by a user (the second user to be described later) different from the user of the terminal device 10 (the first user to be described later) via the communication unit 21 and the network 30.

The storage unit 22 includes one or more memories. Each memory included in the storage unit 22 may function as, for example, a main storage device, an auxiliary storage device, or a cache memory. The storage unit 22 stores any information used for the operation of the arithmetic device 20. For example, the storage unit 22 may store system programs, application programs, embedded software, databases, map information, and the like. The information stored in the storage unit 22 may be updatable with information received from the network 30 via the communication unit 21, for example.

The control unit 23 includes one or more processors, one or more programmable circuits, one or more dedicated circuits, or a combination of these. The control unit 23 controls the operation of the arithmetic device 20 as a whole.

Operation Flow of System

Figure 4:
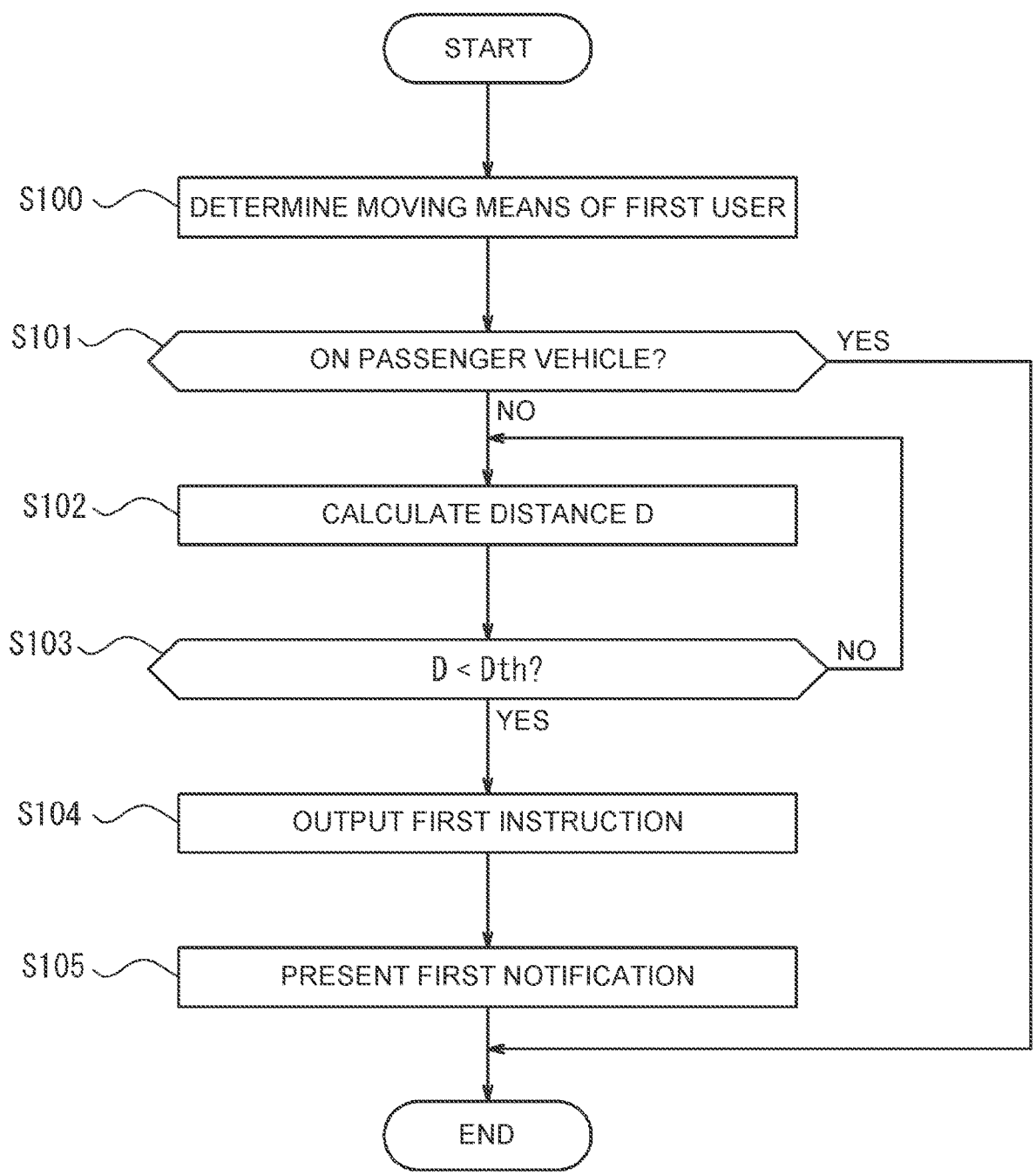
FIG. 4 is a flowchart showing an operation of a system according to a first embodiment.

With reference to FIG. 4, the operation of the system 1 according to the first embodiment will be described. The operation in FIG. 4 corresponds to the method according to the present embodiment. The operation in FIG. 4 shows the operation of the terminal device 10. The operation in FIG. 4 is repeatedly executed, for example, at a predetermined period. The predetermined period can be determined to any length of time.

Step S100

The control unit 16 of the terminal device 10 determines the moving means of the first user who is a user of the terminal device 10.

Figure 5:
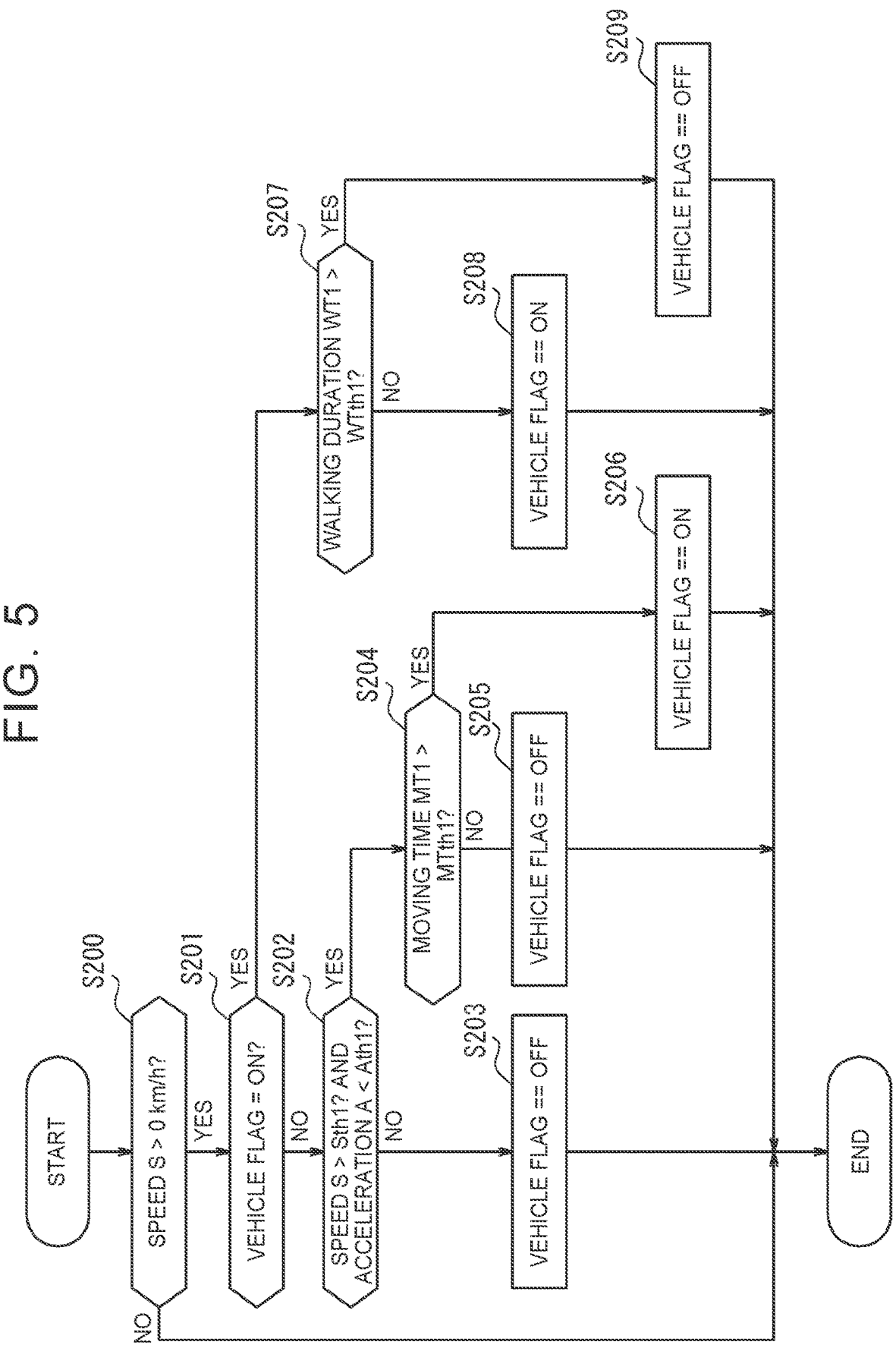
FIG. 5 is a flowchart showing a specific example of vehicle determination.

Any method can be employed to determine the moving means. For example, the control unit 16 may determine the moving means of the first user by executing an operation as shown in FIG. 5 (hereinafter, also referred to as "vehicle determination"). The vehicle determination is a process of determining whether the first user is on a vehicle. The vehicle determination is repeated, for example, at a predetermined period. The predetermined period can be determined to any period. Hereinafter, the vehicle determination will be described with reference to FIG. 5.

Step S200

The control unit 16 determines whether the speed S of the first user is greater than 0 km/h. When it is determined that the speed S is greater than 0 km/h (step S200: Yes), the process proceeds to step S201. On the other hand, when it is determined that the speed S is not greater than 0 km/h, that is, the speed S is equal to 0 km/h (e.g., the first user is stopped) (step S200: No), the process ends.

Any method can be employed to determine whether the speed S is greater than 0 km/h. For example, the control unit 16 may acquire information indicating the speed S of the first user via the acquisition unit 12, and when the speed S is detected to be greater than 0 km/h, the control unit 16 may determine that the speed S is greater than 0 km/h.

Step S201

The control unit 16 determines whether the vehicle flag is ON. When it is determined that the vehicle flag is ON (step S201: Yes), the process proceeds to step S207. On the other hand, when it is determined that the vehicle flag is OFF (step S201: No), the process proceeds to step S202.

Specifically, the control unit 16 refers to the user database stored in the storage unit 15 and determines whether the vehicle flag of the first user is ON.

Step S202

The control unit 16 determines whether the speed S exceeds the threshold value Sth1 and the acceleration A of the first user is less than the threshold value Ath1. When it is determined that the speed S exceeds the threshold value Sth1 and the acceleration A is less than the threshold value Ath1 (step S202: Yes), the process proceeds to step S204. On the other hand, when it is determined that the speed S is equal to or less than the threshold value Sth1 and the acceleration A is equal to or greater than the threshold value Ath1 (step S202: No), the process proceeds to step S203.

Specifically, the control unit 16 acquires information indicating the speed S of the first user via the acquisition unit 12. The control unit 16 determines whether the speed S exceeds the threshold value Sth1. The threshold value Sth1 may be set to any speed (e.g., equal to or greater than 10 km/h) that allows estimation that the first user is on the vehicle rather than walking. Hereinafter, the speed equal to or less than the threshold value Sth1 is also referred to as the "speed of the walking area". Further, the control unit 16 acquires information indicating the acceleration of at least one direction of the X-axis (front-rear direction of the first user), Y-axis (right-left direction of the first user), and Z-axis (up-down direction of the first user) as the acceleration A via the acquisition unit 12. Here, it is generally known that pedestrians suddenly generate acceleration in the positive direction of the Z-axis (i.e., upward direction of the first user) due to reaction at the time of grounding immediately after heel contact. Such acceleration is a pedestrian-specific acceleration that the passengers of the vehicle cannot normally produce. Therefore, the control unit 16 may acquire the acceleration in the positive direction of the Z-axis as the acceleration A. The control unit 16 determines whether the acceleration A is less than the threshold value Ath1. As the threshold value Ath1, any acceleration that allows estimation that the first user is walking (e.g., 1 m/s$^2$ or more in the positive direction of the Z-axis) can be set. Hereinafter, the acceleration equal to or greater than the threshold value Ath1 is also referred to as "acceleration of the walking area". For convenience of explanation, the above describes that the acceleration A is acquired after the speed S is acquired. However, the speed S and the acceleration A may be acquired in reverse order or in parallel.

Here, in the determination of step S202, the reason for considering not only the speed S of the first user but also the acceleration A will be described. When the determination in step S202 is made based only on the speed S of the first user, the following problems occur. For example, assume that when a passenger vehicle with the first user on board decelerates or stops, it is detected that the speed S has reached the speed of the walking area. At this time, even if the first user is actually on the vehicle, it can be immediately determined that the first user is walking. In other words, an erroneous determination may occur. On the other hand, when the acceleration A is also taken into consideration in addition to the speed S, even when it is detected that the speed S has reached the speed of the walking area, it is not immediately determined that the first user is walking unless an acceleration specific to pedestrians is detected. As a result, it is easier to avoid erroneous determination. Therefore, it is possible to improve the determination accuracy as to whether the first user is on the vehicle.

The speed S and the acceleration A are not limited to measured values of a temporary point, and may be representative values (e.g., average values) of the measured values acquired over a predetermined time. As the predetermined time, any time can be set. The measured values may be acquired continuously or at predetermined intervals. For example, the acceleration in the positive direction of the Z-axis is also detected when a route bus, which is a kind of vehicle, rides on an obstacle. In this case, if the measured value of the acceleration of a temporary point is acquired as the acceleration A, it can be erroneously determined that the first user who is actually on the vehicle is walking. In view of this, when the representative value of the result of measuring the acceleration of the first user over a predetermined time is acquired as the acceleration A, it is easier to further avoid such erroneous determination. Therefore, it is possible to further improve the determination accuracy as to whether the first user is on the vehicle.

It is also possible to detect the operation of the first user riding on the vehicle (hereinafter, also referred to as "ride action") based on the acceleration A. The ride action is an action that allows estimation that the first user has ridden on a vehicle. For example, if it is determined whether the first user is on the vehicle based only on the speed S, the determination that the first user is on the vehicle is not made until a predetermined time has elapsed since the vehicle began to move. Thus, if the approach to the checkpoint is detected immediately after the vehicle starts moving, the alert will be performed. On the other hand, if it is determined whether the first user is on the vehicle based on the ride action considering the acceleration A, even when the approach to the checkpoint is detected immediately after the vehicle starts moving, the alert is not performed. Therefore, it is possible to further reduce the first user from feeling annoyed, and further facilitates maintaining the effect of the alert.

Any method can be employed to detect the ride action. For example, the control unit 16 may acquire the position information of the first user by referring to the user database stored in the storage unit 15. The control unit 16 may analyze, based on the acquired position information, the movement route of the first user on the map indicated by the map information, and determine the presence or absence of the ride action according to the analysis result. For example, when it is detected that the position of the first user has moved onto the railroad from the platform of the railway station, the control unit 16 may estimate that a ride action has been made on the railway vehicle by the first user and may avoid performing the alert. Further, for example, when it is detected that the position of the first user on the sidewalk side has moved to the road side with a change in the acceleration in the Z-axis direction, the control unit 16 may estimate that a ride action has been made on a passenger vehicle such as a route bus or a taxi by the first user and may avoid performing the alert. The control unit 16 may acquire, via the network 30 from a device such as a smartphone carried by the first user, information indicating that the first user has passed the automatic ticket gate of the railway station or the route bus. In this case, when such information is acquired, the control unit 16 may estimate that a ride action has been made on a passenger vehicle by the first user and may avoid performing the alert. This makes it easier to further avoid erroneous determination. Therefore, it is possible to further improve the determination accuracy as to whether the first user is on the vehicle.

For such reasons, in the present embodiment, the determination of step S202 is performed considering not only the speed S of the first user but also the acceleration A.

Step S203

When it is determined that the speed S is equal to or less than the threshold value Sth1 and the acceleration A is equal to or greater than the threshold value Ath1 (step S202: No), the control unit 16 maintains the vehicle flag to OFF. After that, the process ends.

Specifically, when the speed S is equal to or less than the threshold value Sth1 and the acceleration A is equal to or greater than the threshold value Ath1, the control unit 16 estimates that the first user is currently walking, and maintains the vehicle flag of the user database stored in the storage unit 15 to OFF. For example, a typical case of step S203 corresponds to a case where the first user is walking at step S201, does not ride on the vehicle thereafter, and remains walking at step S202.

Step S204

When it is determined that the speed S exceeds the threshold value Sth1 and the acceleration A is less than the threshold value Ath1 (step S202: Yes), the control unit 16 determines whether the moving time MT1 of the first user exceeds the threshold value MTth1. When it is determined that the moving time MT1 exceeds the threshold value MTth1 (step S204: Yes), the process proceeds to step S206. On the other hand, when it is determined that the moving time MT1 is equal to or less than the threshold value MTth1 (step S204: No), the process proceeds to step S205.

Specifically, the control unit 16 measures the cumulative moving time of the first user at a speed exceeding the threshold value Sth1 and at an acceleration less than the threshold value Ath1 within a predetermined time, and calculates the measured cumulative moving time as the moving time MT1. As the predetermined time, any time can be set. For example, the predetermined time may be a cumulative moving time of the first user at a speed exceeding the threshold value Sth1 and at an acceleration less than the threshold value Ath1 from the determination time point in step S202 to the determination time point in step S204. The control unit 16 determines whether the calculated moving time MT1 exceeds the threshold value MTth1. As the threshold value MTth1, any time (e.g., 3 seconds) can be set.

Step S205

When it is determined that the moving time MT1 is equal to or less than the threshold value MTth1 (step S204: No), the control unit 16 maintains the vehicle flag to OFF. After that, the process ends.

Specifically, when the moving time MT1 is equal to or less than the threshold value MTth1, the control unit 16 estimates that the first user is not currently on the vehicle, and maintains the vehicle flag of the user database stored in the storage unit 15 to OFF. For example, a typical case of step S205 corresponds to a case where the first user was on the vehicle at step S202 but then gets off and is walking at step S204.

Step S206

When it is determined that the moving time MT1 exceeds the threshold value MTth1 (step S204: Yes), the control unit 16 switches the vehicle flag from OFF to ON. After that, the process ends.

Specifically, when the moving time MT1 exceeds the threshold value MTth1, the control unit 16 estimates that the first user is currently on the vehicle, and switches the vehicle flag of the first user from OFF to ON by referring to the user database stored in the storage unit 15. For example, a typical case of step S206 corresponds to a case where the first user is on the vehicle at step S202 and is on the vehicle at step S204.

Step S207

When it is determined that the vehicle flag is ON (step S201: Yes), the control unit 16 determines whether the walking duration WT1 of the first user exceeds the threshold value WTth1. When it is determined that the walking duration WT1 exceeds the threshold value WTth1 (step S207: Yes), the process proceeds to step S209. On the other hand, when it is determined that the walking duration WT1 is equal to or less than the threshold value WTth1 (step S207: No), the process proceeds to step S208.

Specifically, the control unit 16 measures the cumulative walking time of the first user within a predetermined time, and calculates the measured cumulative walking time as the walking duration WT1. As the predetermined time, any time (e.g., 3 minutes) can be set from the determination time point of step S201 to the determination time point of step S207. Any method can be employed to measure the cumulative walking time. For example, the control unit 16 acquires, via the acquisition unit 12 over a predetermined time, information indicating the speed of the first user and information indicating the acceleration in the positive direction of the Z-axis. The control unit 16 determines whether the speed and the acceleration indicated by the acquired information are each the speed of the walking area and the acceleration of the walking area described above in step S202. When it is determined that the speed and the acceleration indicated by the acquired information are each the speed of the walking area and the acceleration of the walking area, the control unit 16 determines that the first user is walking. The control unit 16 calculates the cumulative time within the predetermined time in which the speed S and the acceleration A indicated by the acquired information are each determined to be the speed of the walking area and the acceleration of the walking area. The control unit 16 calculates the above cumulative time as the walking duration WT1. The control unit 16 determines whether the calculated walking duration WT1 exceeds the threshold value WTth1. As the threshold value WTth1, any time (e.g., 1 minute) can be set.

Step S208

When it is determined that the walking duration WT1 is equal to or less than the threshold value WTth1 (step S207: No), the control unit 16 maintains the vehicle flag to ON. After that, the process ends.

Specifically, when the walking duration WT1 is equal to or less than the threshold value WTth1, the control unit 16 estimates that the first user is currently on the vehicle, and maintains the vehicle flag of the first user of the user database stored in the storage unit 15 to ON. For example, a typical case of step S208 corresponds to a case where the first user is on the vehicle at step S201 and is on the vehicle at step S207.

Step S209

When it is determined that the walking duration WT1 exceeds the threshold value WTth1 (step S207: Yes), the control unit 16 switches the vehicle flag from ON to OFF. After that, the process ends.

Specifically, when the walking duration WT1 exceeds the threshold value WTth1, the control unit 16 estimates that the first user is currently walking, and switches the vehicle flag of the first user from ON to OFF by referring to the user database stored in the storage unit 15. For example, a typical case of step S209 corresponds to a case where the first user was on the vehicle at step S201 but then gets off and is walking at step S207.

Through the vehicle determination described above, the control unit 16 determines whether the first user is on the vehicle.

Figure 6:
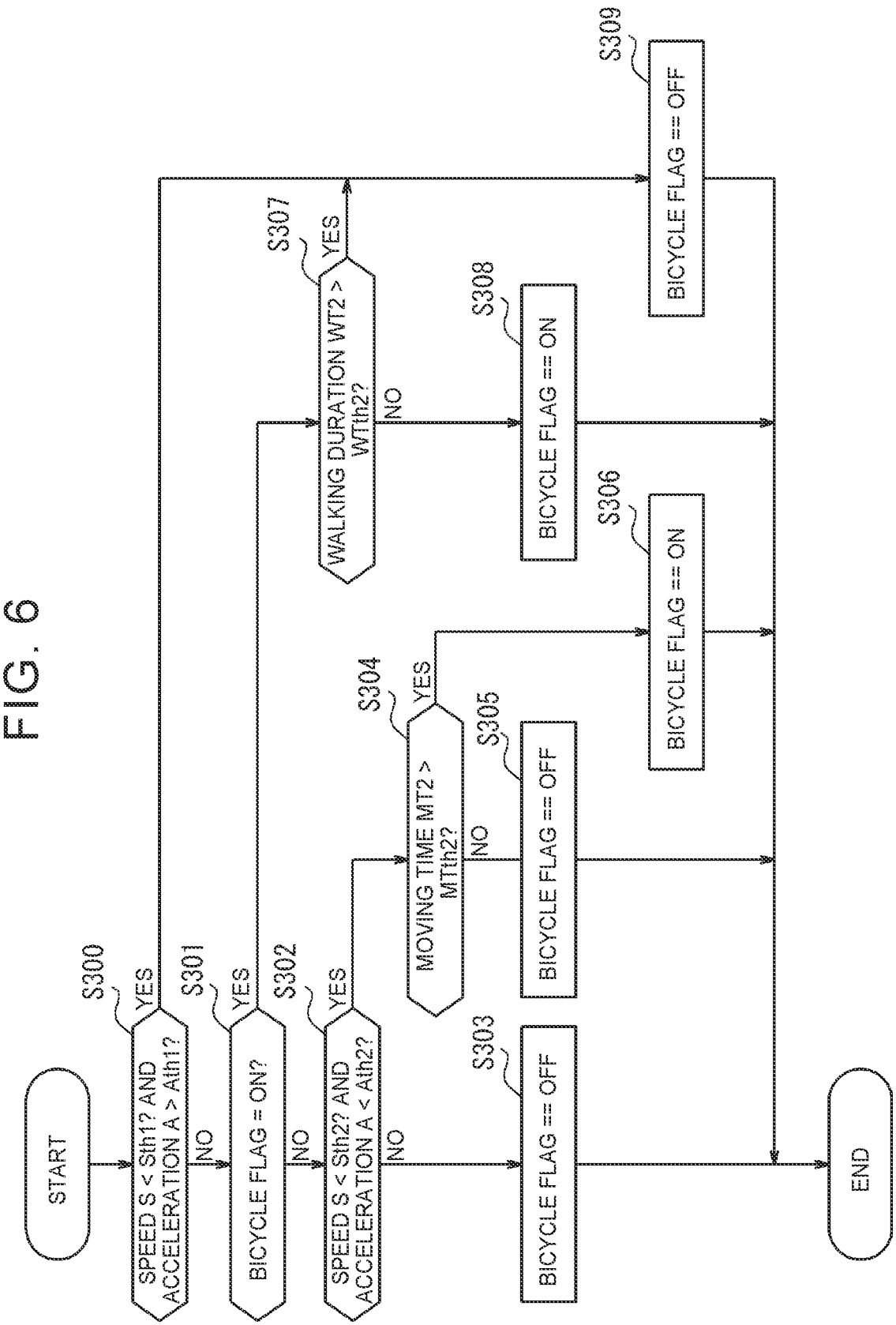
FIG. 6 is a flowchart showing a specific example of bicycle determination.

In the present embodiment, the control unit 16 further determines whether the first user who is determined to be on the vehicle through the vehicle determination is riding a bicycle. Any method can be employed to determine whether the first user is riding a bicycle. For example, the control unit 16 may determine whether the first user is riding a bicycle by executing an operation as shown in FIG. 6 (hereinafter, also referred to as "bicycle determination"). The bicycle determination is a process of determining whether the first user is riding a bicycle. In the present embodiment, the bicycle determination is executed when it is detected that the speed of the first user is greater than 0 km/h after the vehicle determination described above, but the present disclosure is not limited thereto, and any method can be employed. Hereinafter, the bicycle determination will be described with reference to FIG. 6.

Step S300

The control unit 16 determines whether the speed S of the first user is less than the threshold value Sth1 and the acceleration A of the first user exceeds the threshold value Ath1. When it is determined that the speed S is less than the threshold value Sth1 and the acceleration A exceeds the threshold value Ath1 (step S300: Yes), the process proceeds to step S309. On the other hand, when it is determined that the speed S is equal to or greater than the threshold value Sth1 and the acceleration A is equal to or less than the threshold value Ath1 (step S300: No), the process proceeds to step S301. Since the specific process of step S300 is the same as the process of step S202 described above, the description thereof will be omitted.

Step S301

The control unit 16 determines whether the bicycle flag is ON. When it is determined that the bicycle flag is ON (step S301: Yes), the process proceeds to step S307. On the other hand, when it is determined that the bicycle flag is OFF (step S301: No), the process proceeds to step S302.

Specifically, the control unit 16 refers to the user database stored in the storage unit 15 and determines whether the bicycle flag of the first user is ON.

Step S302

The control unit 16 determines whether the speed S of the first user is less than the threshold value Sth2 and the acceleration A of the first user is less than the threshold value Ath2. When it is determined that the speed S is less than the threshold value Sth2 and the acceleration A is less than the threshold value Ath2 (step S302: Yes), the process proceeds to step S304. On the other hand, when it is determined that the speed S is equal to or greater than the threshold value Sth2 and the acceleration A is equal to or greater than the threshold value Ath2 (step S302: No), the process proceeds to step S303.

Specifically, the control unit 16 determines whether the speed S acquired in step S300 is less than the threshold value Sth2. The threshold value Sth2 may be set to any speed (e.g., equal to or greater than 25 km/h) that allows estimation that the first user is on a passenger vehicle rather than a bicycle. Hereinafter, the speed equal to or greater than the threshold value Sth2 is also referred to as the "speed of the passenger vehicle area". Further, the control unit 16 determines whether the acceleration A acquired in step S300 is less than the threshold value Ath2. As the threshold value Ath2, any acceleration that allows estimation that the first user is on a passenger vehicle rather than a bicycle can be set. For example, any acceleration in at least one of the passenger vehicle-specific directions of the X-axis, the Y-axis, or the Z-axis that cannot normally occur in a bicycle may be set as the threshold value Ath2. Hereinafter, the acceleration equal to or greater than the threshold value Ath2 is also referred to as "acceleration of the passenger vehicle area". For convenience of explanation, the above describes that the acceleration A is determined after the speed S is determined. However, the speed S and the acceleration A may be determined in reverse order or in parallel.

Here, in the determination of step S302, the reason for considering not only the speed S of the first user but also the acceleration A will be described. When the determination in step S302 is made based only on the speed S of the first user, the following problems occur. For example, assume that the speed S is detected to be the speed of the passenger vehicle area while the first user is riding a bicycle. At this time, even if the first user is actually riding a bicycle, it can be immediately determined that the first user is on the passenger vehicle. In other words, an erroneous determination may occur. On the other hand, when the acceleration A is also taken into consideration in addition to the speed S, even when it is detected that the speed S has reached the speed of the passenger vehicle area, it is not immediately determined that the first user is on the passenger vehicle unless an acceleration specific to the passenger vehicle is detected. As a result, it is easier to avoid erroneous determination. Therefore, it is possible to further improve the determination accuracy as to whether the first user is riding a bicycle.

As described above in step S202, the speed S and the acceleration A are not limited to the measured values of temporary points, and may be representative values of the measured values acquired over a predetermined time. This makes it easier to further avoid erroneous determinations in which the first user who is riding a bicycle is determined to be on the passenger vehicle. Therefore, it is possible to further improve the determination accuracy as to whether the first user is riding a bicycle.

For such reasons, in the present embodiment, the determination of step S302 is performed considering not only the speed S of the first user but also the acceleration A.

Step S303

When it is determined that the speed S is equal to or greater than the threshold value Sth2 and the acceleration A is equal to or greater than the threshold value Ath2 (step S302: No), the control unit 16 maintains the bicycle flag to OFF. After that, the process ends.

Specifically, when the speed S is equal to or greater than the threshold value Sth2 and the acceleration A is equal to or greater than the threshold value Ath2, the control unit 16 estimates that the first user is currently on a passenger vehicle rather than a bicycle, and maintains the bicycle flag of the first user to OFF by referring to the user database stored in the storage unit 15. For example, a typical case of step S303 corresponds to a case where the first user is on the passenger vehicle at step S301 and is on the passenger vehicle at step S302.

Step S304

When it is determined that the speed S is less than the threshold value Sth2 and the acceleration A is less than the threshold value Ath2 (step S302: Yes), the control unit 16 determines whether the moving time MT2 of the first user exceeds the threshold value MTth2. When it is determined that the moving time MT2 exceeds the threshold value MTth2 (step S304: Yes), the process proceeds to step S306. On the other hand, when it is determined that the moving time MT2 is equal to or less than the threshold value MTth2 (step S304: No), the process proceeds to step S305.

Specifically, the control unit 16 measures the cumulative moving time of the first user at a speed less than the threshold value Sth2 and at an acceleration less than the threshold value Ath2 within a predetermined time, and calculates the measured cumulative moving time as the moving time MT2. As the predetermined time, any time (e.g., 3 minutes) can be set from the determination time point of step S302 to the determination time point of step S304. Any method can be employed to measure the cumulative moving time. For example, the control unit 16 acquires, via the acquisition unit 12 over a predetermined time, information indicating the speed of the first user and information indicating the acceleration in the positive direction of the Z-axis. The control unit 16 calculates the cumulative time within a predetermined time in which the speed and the acceleration indicated by the acquired information are each less than the threshold value Sth2 and the threshold value Ath2. The control unit 16 calculates the above cumulative time as the moving time MT2. The control unit 16 determines whether the calculated moving time MT2 exceeds the threshold value MTth2. As the threshold value MTth2, any time (e.g., 1 minute) can be set.

Step S305

When it is determined that the moving time MT2 is equal to or less than the threshold value MTth2 (step S304: No), the control unit 16 maintains the bicycle flag to OFF. After that, the process ends.

Specifically, when the moving time MT2 is equal to or less than the threshold value MTth2, the control unit 16 estimates that the first user is not currently riding a bicycle and maintains the bicycle flag of the first user of the user database stored in the storage unit 15 to OFF. For example, a typical case of step S305 corresponds to a case where the first user is on a passenger vehicle at step S301, but gets off from the passenger vehicle and gets on a bicycle at step S302, and gets off from the bicycle and is walking at step S304.

Step S306

When it is determined that the moving time MT2 exceeds the threshold value MTth2 (step S304: Yes), the control unit 16 switches the bicycle flag from OFF to ON. After that, the process ends.

Specifically, when the moving time MT2 exceeds the threshold value MTth2, the control unit 16 estimates that the first user is currently riding a bicycle, and switches the bicycle flag of the first user from OFF to ON by referring to the user database stored in the storage unit 15. For example, a typical case of step S306 corresponds to a case where the first user is on a passenger vehicle at step S301, but gets off from the passenger vehicle and gets on a bicycle at step S302, and is riding the bicycle at step S304.

Step S307

When it is determined that the bicycle flag is ON (step S301: Yes), the control unit 16 determines whether the walking duration WT2 of the first user exceeds the threshold value WTth2. When it is determined that the walking duration WT2 exceeds the threshold value WTth2 (step S307: Yes), the process proceeds to step S309. On the other hand, when it is determined that the walking duration WT2 is equal to or less than the threshold value WTth2 (step S307: No), the process proceeds to step S308.

Specifically, the control unit 16 measures the cumulative walking time of the first user within a predetermined time, and calculates the measured cumulative walking time as the walking duration WT2. As the predetermined time, any time (e.g., 5 minutes) can be set from the determination time point of step S301 to the determination time point of step S307. Any method can be employed to measure the cumulative walking time. For example, the control unit 16 acquires, via the acquisition unit 12 over a predetermined time, information indicating the speed of the first user and information indicating the acceleration in the positive direction of the Z-axis. The control unit 16 determines whether the speed and the acceleration indicated by the acquired information are each the speed of the walking area and the acceleration of the walking area described above in step S202. When it is determined that the speed and the acceleration indicated by the acquired information are each the speed of the walking area and the acceleration of the walking area, the control unit 16 determines that the first user is walking. The control unit 16 calculates the cumulative time within a predetermined time in which the speed and the acceleration indicated by the acquired information are determined to be the speed of the walking area and the acceleration of the walking area. The control unit 16 calculates the above cumulative time as the walking duration WT2. The control unit 16 determines whether the calculated walking duration WT2 exceeds the threshold value WTth2. As the threshold value WTth2, any time (e.g., 3 minutes) can be set. The threshold value WTth2 may be the same as or different from the threshold value WTth1 described above.

Step S308

When it is determined that the walking duration WT2 is equal to or less than the threshold value WTth2 (step S307: No), the control unit 16 maintains the bicycle flag to ON. After that, the process ends.

Specifically, when the walking duration WT2 is equal to or less than the threshold value WTth2, the control unit 16 estimates that the first user is currently riding a bicycle, and maintains the bicycle flag of the first user of the user database stored in the storage unit 15 to ON. For example, a typical case of step S308 corresponds to a case where the first user is riding a bicycle at step S301 and is riding the bicycle at step S307.

Step S309

When it is determined that the walking duration WT2 exceeds the threshold value WTth2 (step S307: Yes), the control unit 16 switches the bicycle flag from ON to OFF. After that, the process ends.

Specifically, when the walking duration WT2 exceeds the threshold value WTth2, the control unit 16 estimates that the first user is not currently riding a bicycle, and switches the bicycle flag of the first user from ON to OFF by referring to the user database stored in the storage unit 15. For example, a typical case of step S309 corresponds to a case where the first user is riding a bicycle at step S301, but then gets off and is walking at step S307.

Through the bicycle determination described above, the control unit 16 determines whether the first user is riding a bicycle.

Step S101

The control unit 16 determines whether the first user is on a passenger vehicle. When it is determined that the first user is on a passenger vehicle (step S101: Yes), the process ends. On the other hand, when it is determined that the first user is not on a passenger vehicle (step S101: No), the process proceeds to step S102.

Specifically, the control unit 16 refers to the user database stored in the storage unit 15 after the vehicle determination and the bicycle determination described above. When the vehicle flag of the first user is ON and the bicycle flag is OFF, the control unit 16 determines that the first user is on a passenger vehicle. On the other hand, when the vehicle flag of the first user is OFF, or when the vehicle flag of the first user is ON and the bicycle flag is ON, the control unit 16 determines that the first user is not on a passenger vehicle. When it is determined that the first user is not on a passenger vehicle, the first condition that the first user is not on a passenger vehicle, that is, the first condition of the present embodiment is satisfied.

Next, the control unit 16 determines whether the second condition of the present embodiment is satisfied. The second condition of the present embodiment is, as will be described later, a condition that the first user has approached at least one checkpoint of the one or more checkpoints. Specifically, the control unit 16 determines whether the second condition is satisfied by executing the processes of the following steps S102 and S103.

Step S102

The control unit 16 calculates the distance D.

Specifically, the control unit 16 acquires the position information of the first user by referring to the user database stored in the storage unit 15. Based on the acquired position information, the control unit 16 calculates the distance between the position of the first user on the map indicated by the map information and each of the one or more checkpoints on the map. The storage unit 15 stores map information in which the position information of each of the one or more checkpoints is set. The one or more checkpoints include at least one of a first checkpoint that is set not based on an input of a second user different from the first user (e.g., a parent of the first user) and a second checkpoint that is set based on an input of the second user. The first checkpoint is set based on information such as traffic volume, accident information, or vehicle travel data in the present embodiment, but is not limited thereto, and can be set based on any information. The traffic volume or the accident information is, for example, data related to traffic information provided by the Japan Road Traffic Information Center via the network 30, but is not limited thereto, and may be any data. The travel data of the vehicle is, for example, data generated based on data communication module (DCM) data collected via the network 30 from vehicles traveling on points on the map in order to specify points where dangerous driving is likely to occur, such as sudden braking or stop violation, but is not limited thereto, and may be any data. Any method can be employed to set the second checkpoint. For example, the second user may cause the display of a smartphone carried by the second user to display the map information and operate the touch panel to set a desired point (e.g., a point on the first user's commuting street) different from the first checkpoint on the map indicated by the map information as the second checkpoint. The second user may transmit information indicating the set second checkpoint to the arithmetic device 20 via the communication unit of the smartphone. The arithmetic device 20 may transmit, to the terminal device 10, data in which the received information indicating the second checkpoint and the map information stored in the storage unit 22 are associated with each other. The terminal device 10 may update the map information stored in the storage unit 15 with the received data. The control unit 16 then calculates the distance between the position of the first user on the map indicated by the map information and each of the one or more checkpoints on the map. The control unit 16 calculates the distance between at least one checkpoint with the smallest calculated distance and the first user as the distance D. However, the calculation of the distance D is not limited to these examples, and any method can be employed.

Step S103

The control unit 16 determines whether the distance D calculated in step S102 is less than the threshold value Dth. When it is determined that the distance D is less than the threshold value Dth (step S103: Yes), the process proceeds to step S104. On the other hand, when it is determined that the distance D is equal to or greater than the threshold value Dth (step S103: No), the process returns to step S102.

Specifically, by comparing the distance D and the threshold value Dth, the control unit 16 specifies at least one checkpoint with the distance D that is less than the threshold value Dth. When the distance D is less than the threshold value Dth, the control unit 16 determines that the first user has approached the at least one checkpoint. When it is determined that the first user has approached the at least one checkpoint, the condition that the first user has approached at least one checkpoint of the one or more checkpoints, that is, the second condition of the present embodiment is satisfied. As the threshold value Dth, any distance (e.g., radius of 5 m) can be set. However, the determination as to whether the first user has approached at least one checkpoint of the one or more checkpoints is not limited to these examples, and any method may be employed. Hereinafter, this determination is also referred to as "approach determination".

In the present embodiment, the control unit 16 sets the threshold value Dth so that the threshold value Dth is longer when the first user's moving means is a bicycle than when walking. Because the bicycle moves faster than walking, if it is determined whether the first user has approached at least one checkpoint of the one or more checkpoints based on the same criteria during walking and riding on the bicycle, the timing of the alert may be delayed and the effect of the alert may be reduced. Therefore, by setting the threshold value Dth longer when the moving means of the first user is a bicycle than when the moving means of the first user is walking, it is possible to accelerate the timing of the alert during riding on the bicycle, which makes it possible to suppress a delay in the timing of the alert.

Step S104

The control unit 16 outputs the first instruction for presenting the first notification for prompting the first user to perform a safety action.

Specifically, when both the first condition and the second condition of the present embodiment are satisfied (step S101: No and step S103: Yes), the control unit 16 transmits, to the output unit 13, the first instruction instructing to present the first notification for prompting the first user to perform a safety action. The first notification may be a voice, a text message, an image, vibration, or a combination thereof, but is presented in the form of a voice (hereinafter, also referred to as a "first voice") corresponding to the alert in the present embodiment. The first voice may be any voice, such as a synthetic voice or a recorded voice. On the other hand, the control unit 16 does not output the first instruction when at least one of the first condition and the second condition is not satisfied. In step S104, as described above, both the first condition and the second condition are satisfied. Therefore, the control unit 16 transmits the first instruction to the output unit 13. For the first notification, one option may be set for each safety action or a plurality of options may be set for each safety action. Any method can be employed to set the options of the first notification. For example, the storage unit 15 may store the first voice corresponding to the first notification in the notification database by associating each of the one or more checkpoints with each safety action. For example, the storage unit 15 may store the first voice of "look both ways" corresponding to the first notification in the notification database in association with a checkpoint set at the intersection. This can prompt appropriate safety actions for each of the one or more checkpoints. In addition, when multiple options of the first notification are set for each safety action, the first notification that should be presented may be randomly selected each time. This suppresses the first user from feeling bored by the same notification being presented each time, which makes it easier to maintain the effect of the alert. The control unit 16 searches the notification database based on the first notification ID, and selects one first notification from one or more options of the first notification. However, the selection of the first notification is not limited to these examples, and any method can be employed. The control unit 16 transmits, to the output unit 13, the first instruction instructing to present the selected first notification.

Step S105

The control unit 16 presents the first notification via the output unit 13.

Specifically, the control unit 16 plays the first voice corresponding to the first notification selected in step S104 to the first user via the output unit 13. After that, the process ends.

Figure 7:
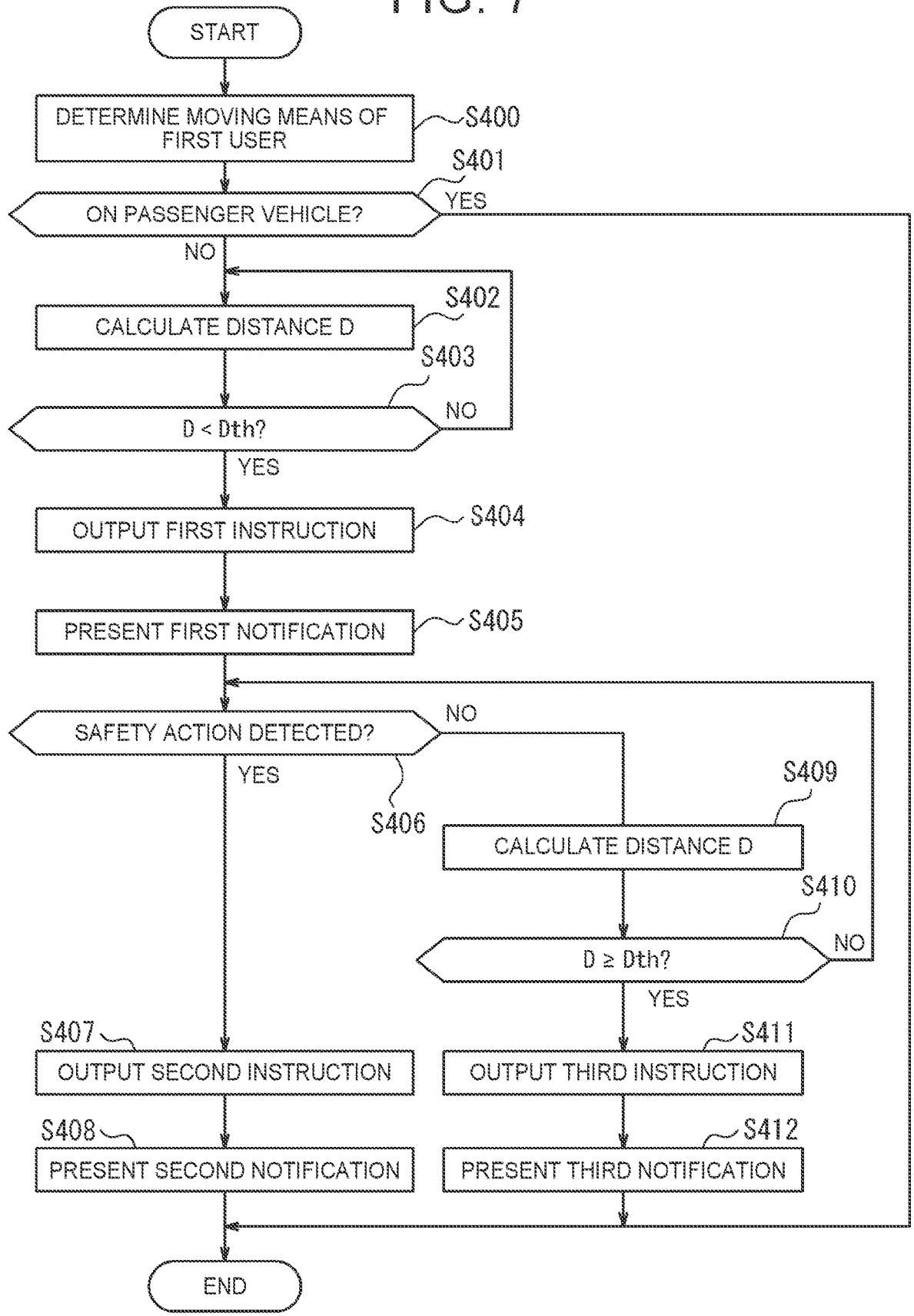
FIG. 7 is a flowchart showing an operation of a system according to a second embodiment.

Next, with reference to FIG. 7, the operation of the system 1 according to a second embodiment will be described. The operation in FIG. 7 corresponds to the method according to the present embodiment. The operation in FIG. 7 shows the operations of the terminal device 10 and the arithmetic device 20. The operation in FIG. 7 is repeatedly executed, for example, at a predetermined period. The predetermined period can be determined to be any period. Since the processes from step S400 to step S405 are the same as the processes from step S100 to step S105 described in the first embodiment, the description thereof will be omitted. Hereinafter, the processes of step S406 and after that are executed after presenting the first notification in step S405, which is the main difference from the first embodiment, will be described.

Step S406

The control unit 16 determines whether a safety action of the first user is detected within the peripheral area of the at least one checkpoint. When it is determined that a safety action of the first user is detected (step S406: Yes), the process proceeds to step S407. On the other hand, when it is determined that a safety action of the first user is not detected (step S406: No), the process proceeds to step S409.

Specifically, the control unit 16 acquires information indicating the behavior of the first user in addition to the position information of the first user via the acquisition unit 12. Any method can be employed to acquire the information indicating the behavior of the first user. For example, by analyzing signals of the angular velocity sensor and/or the geomagnetic sensor of the acquisition unit 12, the control unit 16 may acquire the information indicating the behavior of the first user (e.g., whether the head of the first user is swung right and left). By analyzing the position information of the first user and the information indicating the behavior of the first user that have been acquired, the control unit 16 determines whether a safety action of the first user (e.g., looking both ways) is detected in the peripheral area of the at least one checkpoint. Hereinafter, this determination is also referred to as "action determination". The "peripheral area" is an area in which the distance D is less than the threshold value Dth in the present embodiment. That is, the peripheral area is defined based on the threshold value Dth that is a criterion of the approach determination in the present embodiment. In the present embodiment, when the distance D is less than the threshold value Dth, the control unit 16 estimates that the first user is in the peripheral area. However, any method can be employed to define the peripheral area. For example, the peripheral area may be defined using a value greater (e.g., radius of 6 m) or smaller (e.g., radius of 2 m) than the threshold value Dth (e.g., radius of 5 m). In other words, the peripheral area may be defined independently of the threshold value Dth without depending on the threshold value Dth.

In the present embodiment, the information indicating whether the position information and the safety action are detected is stored in the storage unit 15 together with the time. However, the information may be stored in an external storage, for example, in the storage unit 22 of the arithmetic device 20. Further, the control unit 16 may transmit the position information, information indicating the presence or absence of the safety action, and the time stored in the storage unit 15 to the communication unit 21 of the arithmetic device 20 via the communication unit 11. In this case, the control unit 23 of the arithmetic device 20 stores the position information, the information indicating the presence or absence of the safety action, and the time, which have been received via the communication unit 21, in the storage unit 22. The control unit 23 may generate data (hereinafter, also referred to as "historical data") indicating the history of the movement route and the safety action of the first user on the map indicated by the map information, using the position information, the information indicating the presence or absence of the safety action, and the time. In this case, the control unit 23 may transmit the above data to the smartphone of the second user, for example, in response to a request from the smartphone of the second user. On the second user side, the received history data may be applied to the map displayed on the display of the smartphone so that the second user can see the movement route and the history of the safety action of the first user. In addition, the second user may add or delete a second checkpoint as needed from the viewpoint of ensuring the safety of the first user.

Step S407

When it is determined that the safety action of the first user has been detected (step S406: Yes), the control unit 16 outputs a second instruction for presenting the second notification different from the first notification.

Specifically, after outputting the first instruction in step S404, when the safety action of the first user is detected in step S406, the control unit 16 transmits, to the output unit 13, the second instruction instructing to present the second notification different from the first notification. The second notification may be a voice, a text message, an image, vibration, or a combination thereof, but is presented in the form of a voice (hereinafter also referred to as a "second voice") for presenting a positive determination result to the first user in the present embodiment. The second voice may be any voice, such as a synthetic voice or a recorded voice. For example, the second voice may be a voice of "well done". This makes it easier to maintain a motivation for the safety action of the first user. For the second notification, one option may be set or a plurality of options may be set. Any method can be employed to set the options of the second notification. For example, the storage unit 15 may store the second voice corresponding to the second notification in the notification database in association with each of the options of the first voice corresponding to the first notification. Thus, the second notification corresponding to each of the options of the first notification can be presented to the first user. In addition, when multiple options of the second notification are set, the second notification that should be presented may be randomly selected each time. This suppresses the first user from feeling bored by the same notification being presented each time, which makes it easier to maintain the effect of the alert. The control unit 16 searches the notification database based on the second notification ID, and selects one second notification from one or more options of the second notification. However, the selection of the second notification is not limited to these examples, and any method can be employed. The control unit 16 transmits, to the output unit 13, the second instruction for presenting the selected second notification.

Step S408

The control unit 16 presents the second notification.

Specifically, the control unit 16 plays the second voice corresponding to the second notification selected in step S407 to the first user via the output unit 13. After that, the process ends.

Step S409

When it is determined that the safety action of the first user is not detected (step S406: No), the control unit 16 calculates the distance D. Since the calculation method of the distance D is the same as that in step S102 and step S402 described above, the description thereof will be omitted.

Step S410

The control unit 16 determines whether the distance D is equal to or greater than the threshold value Dth. When it is determined that the distance D is equal to or greater than the threshold value Dth (step S410: Yes), the process proceeds to step S411. On the other hand, when it is determined that the distance D is less than the threshold value Dth (step S410: No), the process returns to step S406.

Specifically, when the distance D becomes equal to or greater than the threshold value Dth, the control unit 16 estimates that, after outputting the first instruction in step S404, the first user exits from the peripheral area of at the least one checkpoint while the safety action is not detected. On the other hand, when the distance D is less than the threshold value Dth, the control unit 16 estimates that the first user remains in the peripheral area, and executes the determination of step S406 again.

Step S411

When it is determined that the distance D is equal to or greater than the threshold value Dth (step S410: Yes), the control unit 16 outputs a third instruction for presenting a third notification different from the first notification and the second notification.

Specifically, through the determination in step S410, when it is estimated that the first user has exited from the peripheral area of the at least one checkpoint while the safety action is not detected after the output of the first instruction in step S404, the control unit 16 transmits, to the output unit 13, the third instruction for presenting the third notification. The third notification may be a voice, a text message, an image, vibration, or a combination thereof, but is presented in the form of a voice (hereinafter also referred to as a "third voice") for presenting a negative determination result to the first user in the present embodiment. The third voice may be any voice, such as a synthetic voice or a recorded voice. For the third notification, one option may be set or a plurality of options may be set. Any method can be employed to set the options of the third notification. For example, the storage unit 15 may store the third voice corresponding to the third notification in the notification database in association with each of the options of the first voice corresponding to the first notification. For example, the storage unit 15 may store the third voice of "look both ways next time" corresponding to the third notification in the notification database in association with the first voice of "look both ways" corresponding to the first notification. Thus, the third notification corresponding to each of the options of the first notification can be presented to the first user. In addition, when multiple options of the third notification are set, the third notification that should be presented may be randomly selected each time. This suppresses the first user from feeling bored by the same notification being presented each time, which makes it easier to maintain the effect of the alert. The control unit 16 searches the notification database based on the third notification ID, and selects one third notification from one or more options of the third notification. However, the selection of the third notification is not limited to these examples, and any method can be employed. The control unit 16 transmits, to the output unit 13, the third instruction for presenting the selected third notification.

Step S412

The control unit 16 presents the third notification.

Specifically, the control unit 16 plays the third voice corresponding to the third notification selected in step S411 to the first user via the output unit 13. After that, the process ends.

Figure 8:
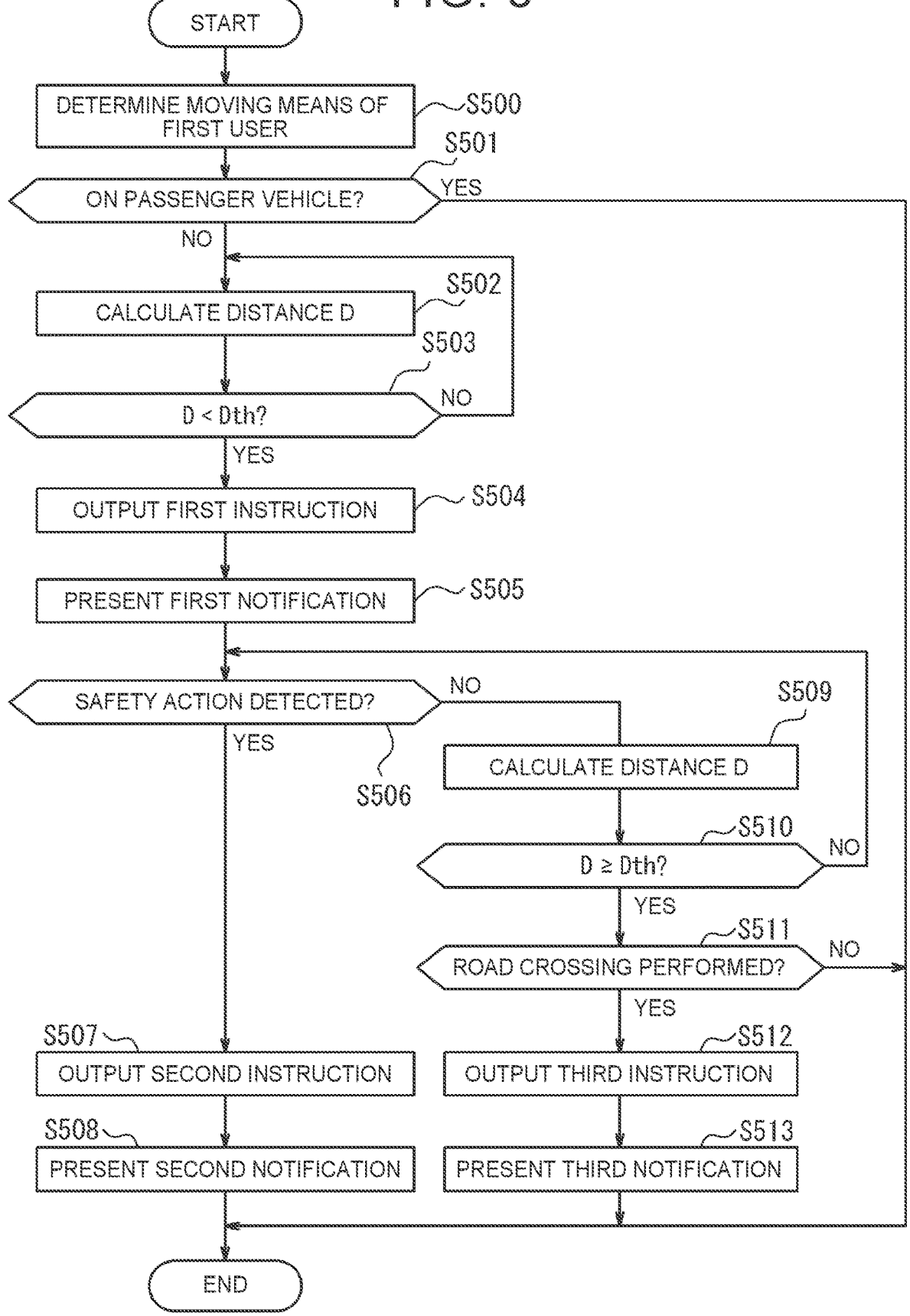
FIG. 8 is a flowchart showing an operation of a system according to a third embodiment.

Next, with reference to FIG. 8, the operation of the system 1 according to a third embodiment will be described. The operation in FIG. 8 corresponds to the method according to the present embodiment. The operation in FIG. 8 shows the operations of the terminal device 10 and the arithmetic device 20. The operation in FIG. 8 is repeatedly executed, for example, at a predetermined period. The predetermined period can be determined to be any period. The third embodiment differs from the second embodiment only in that the process of step S511 is added. The processes from step S500 to step S505 are the same as the processes from step S100 to step S105 described in the first embodiment. The processes from step S506 to step S510 are the same as the processes from step S406 to step S410 described in the second embodiment, and the processes of steps S512 and S513 are the same as the processes of steps S411 and S412 described in the second embodiment. Therefore, description of these processes will be omitted. Hereinafter, the process of step S511 executed when the distance D becomes equal to or greater than the threshold value Dth through the determination of step S510, which is the main difference from the second embodiment, will be described.

Step S511

The control unit 16 determines whether road crossing has been performed by the first user. When it is determined that the road crossing has been performed by the first user (step S511: Yes), the process proceeds to step S512. On the other hand, when it is determined that the road crossing has not been performed by the first user (step S511: No), the process ends.

Specifically, when the distance D becomes equal to or greater than the threshold value Dth through the determination of step S510, the control unit 16 estimates that, after outputting the first instruction in step S504, the first user exits from the peripheral area of at the least one checkpoint while the safety action is not detected. In the present embodiment, in step S511, the control unit 16 further determines whether the road crossing has been performed by the first user in the peripheral area. Any method can be employed to determine the road crossing. For example, assume that the at least one checkpoint is an intersection without traffic lights, and the first notification is "look both ways" and the third notification is "look both ways next time". In this case, the control unit 16 may acquire the position information of the first user by referring to the user database stored in the storage unit 15. Based on the acquired position information, the control unit 16 may analyze the movement route of the first user on the map indicated by the map information, and determine whether the road crossing has been performed by the first user at the at least one checkpoint. According to the determination result, the control unit 16 may determine whether to output the third instruction for presenting the third notification.

In this example, when the first user crosses the road at the intersection, looking both ways to confirm that a vehicle is not approaching before crossing the road by the first user is regarded as a safety action. Therefore, after the output of the first instruction, if the first user leaves the peripheral area while the safety action is not detected and the road crossing has been performed by the first user in the peripheral area, it is necessary to output the third notification. In this case, the control unit 16 proceeds to step S512 and outputs the third instruction, as described above in step S411. On the other hand, when the first user simply makes a turn at the corner at the intersection and does not cross the road, the first user does not need to look both ways to confirm that a vehicle is not approaching. When the first user exits the peripheral area while the safety action is not detected, presenting the third notification even when the road crossing has not been performed by the first user in the peripheral area easily causes the first user to feel annoyed. Therefore, after the output of the first instruction, if the first user leaves the peripheral area while the safety action is not detected and the road crossing has not been performed by the first user in the peripheral area, it is not necessary to output the third notification. In this case, the control unit 16 does not output the third instruction.

As described above, after the output of the first instruction in step S504, when the first user leaves the peripheral area while the safety action is not detected and the road crossing has been performed by the first user in the peripheral area, the control unit 16 outputs the third instruction as described above in step S411. On the other hand, after the output of the first instruction, when the first user leaves the peripheral area while the safety action is not detected and the road crossing has not been performed by the first user in the peripheral area, the control unit 16 does not output the third instruction. Thus, it is possible to determine whether to output the third instruction according to the presence or absence of the road crossing by the first user. As a result, it is easy to avoid presenting the third notification in unnecessary situations. Therefore, it is possible to further reduce the first user from feeling annoyed, and further facilitates maintaining the effect of the alert.

As described above, the terminal device 10, which is the information processing device according to the above-described embodiment, determines the moving means of the first user. The terminal device 10 outputs the first instruction to present the first notification for prompting the first user to perform a safety action when both the first condition and the second condition are satisfied. The terminal device 10 does not output the first instruction when at least one of the first condition and the second condition is not satisfied. In the embodiment described above, the first condition is that the first user is not on a passenger vehicle. In the embodiment described above, the second condition is that the first user has approached at least one checkpoint of the one or more checkpoints. The terminal device 10 acquires the position information of the first user. The terminal device 10 determines, based on the position information, whether the first user has approached the at least one checkpoint of the one or more checkpoints.

According to such a configuration, only when both the first condition and the second condition are satisfied, the first instruction to present the first notification for prompting the safety action to the first user is output. According to the present embodiment, unlike the prior art, since the alert is not performed when the first user is on a passenger vehicle, it is easy to avoid a situation in which the first notification is presented at an unnecessary timing. Therefore, it is possible to reduce causing the first user to feel annoyed and to easily maintain the effect of the alert, so that the technology related to traffic safety education is improved.

Although the present disclosure has been described above based on the drawings and the embodiments, it should be noted that those skilled in the art may make various modifications and alterations thereto based on the present disclosure. It should be noted, therefore, that these modifications and alterations are within the scope of the present disclosure. For example, the functions included in the configurations, steps, etc. can be rearranged so as not to be logically inconsistent, and a plurality of configurations, steps, etc. can be combined into one or divided.

Figure 9:
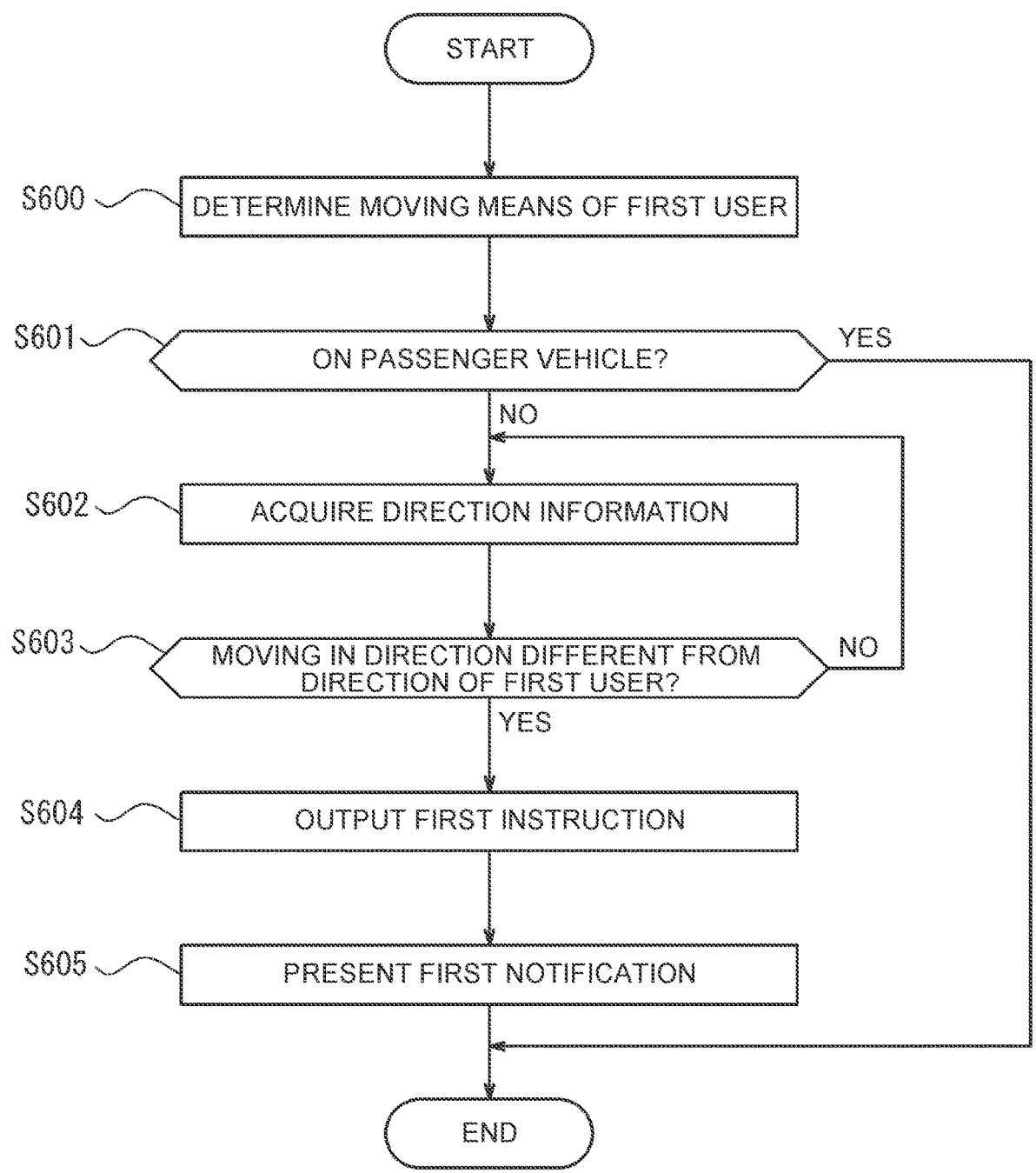
FIG. 9 is a flowchart showing an operation of a system according to a modification.

In a modification of the embodiment described above, the second condition may be a condition that the first user is moving in a direction different from the direction of the first user. In the present modification, by analyzing the direction and the traveling direction of the first user, the behavior (hereinafter, also referred to as "unsafety action") dangerous to the first user is detected. When an unsafety action is detected, it is easy to secure the safety of the first user by presenting the first notification to prompt the first user to take a safety action. In the present modification, the unsafety action is an action where "the first user is moving in a direction different from the direction of the first user", which is typically an action where the first user is walking while looking aside or where the first user is walking backward, but is not limited thereto. Any method can be employed to determine the direction of the first user. For example, the control unit 16 of the terminal device 10 may determine the direction of the first user by executing the operation as shown in FIG. 9 (hereinafter, also referred to as "direction determination"). The direction determination is repeated, for example, at a predetermined period. The predetermined period can be determined to be any period. Since the processes of steps S600 and S601 are the same as steps S100 and S101 described in the first embodiment, the description thereof will be omitted. Hereinafter, the processes of step S602 and after, which are the main differences from the first embodiment, will be described.

Step S602

The control unit 16 acquires the direction information indicating the direction of the first user.

Specifically, by analyzing the angular velocity sensor and/or the signal of the geomagnetic sensor of the acquisition unit 12, the control unit 16 acquires the direction information indicating the direction of the first user. The control unit 16 also acquires the position information of the first user together with the direction information. The control unit 16 specifies the traveling direction of the first user from the movement route of the first user on the map, acquired by analyzing the acquired position information. Additionally or alternatively, the control unit 16 may specify the traveling direction of the first user by analyzing the signal of the acceleration sensor of the acquisition unit 12. However, to acquire the direction information and to specify the traveling direction, any method can be employed without being limited to these examples.

Step S603

The control unit 16 determines whether the first user is moving in a direction different from the direction of the first user. When it is determined that the first user is moving in a direction different from the direction of the first user (step S603: Yes), the process proceeds to step S604. On the other hand, when it is determined that the first user is not moving in a direction different from the direction of the first user (step S603: No), the process returns to step S602.

Specifically, the control unit 16 compares the direction of the first user indicated by the direction information acquired in step S602 and the specified traveling direction of the first user. As a result of the comparison, when it is determined that the direction of the first user and the traveling direction of the first user is not substantially the same, the control unit 16 determines that the first user is moving in a direction different from the direction of the first user. In this case, the condition that the first user is moving in a direction different from the direction of the first user, that is, the second condition of the present modification is satisfied. On the other hand, when it is determined that the direction of the first user and the traveling direction of the first user is substantially the same, the control unit 16 determines that the first user is not moving in a direction different from the direction of the first user. "The direction of the first user and the traveling direction of the first user being substantially the same" means that the direction of the first user and the traveling direction of the first user define a predetermined angle difference or less (e.g., 90° or less). The predetermined angle difference can be set to any angle in accordance with the mounting position of the terminal device 10. However, the determination as to whether the first user is moving in a direction different from the direction of the first user is not limited to these examples, and any method can be employed.

Step S604

When it is determined that the first user is moving in a direction different from the direction of the first user (step S603: Yes), the control unit 16 outputs the first instruction to present the first notification for prompting the first user to perform a safety action.

Specifically, when both the first condition and the second condition of the present modification are satisfied (step S601: No and step S603: Yes), the control unit 16 transmits, to the output unit 13, the first instruction instructing to present the first notification for prompting the first user to perform a safety action. On the other hand, when at least one of the first condition and the second condition is not satisfied, the control unit 16 does not output the first instruction. In step S604, as described above, both the first condition and the second condition are satisfied. Therefore, the control unit 16 transmits the first instruction to the output unit 13. The first notification according to the present modification is a voice corresponding to the alert presented from the output unit 13 when an unsafety action is detected. In the first notification according to the present modification, one option may be set for each unsafety action or a plurality of options may be set for each unsafety action. Any method can be employed to set the options of the first notification according to the present modification. For example, the storage unit 15 may store a voice corresponding to the first notification in the notification database in association with each unsafety action. For example, the unsafety action of the present modification is typically walking while looking aside or walking backwards. In this case, the storage unit 15 may store, in the notification database, a voice of "walk while looking forward" corresponding to the first notification in association with the unsafety action. This can prompt safety actions that are appropriate for each unsafety action. In addition, when multiple options of the first notification are set for each unsafety action, the first notification that should be presented may be randomly selected each time. This suppresses the first user from feeling bored by the same notification being presented each time, which makes it easier to maintain the effect of the alert. The control unit 16 searches the notification database based on the first notification ID, and selects one first notification from one or more options of the first notification. However, the selection of the first notification is not limited to these examples, and any method can be employed. The control unit 16 transmits, to the output unit 13, the first instruction instructing to present the selected first notification.

Step S605

The control unit 16 presents the first notification via the output unit 13.

Specifically, the control unit 16 plays the voice corresponding to the first notification selected in step S604 to the first user via the output unit 13. After that, the process ends.

According to the present modification, by determining whether the second condition according to the present modification is satisfied, it is possible to detect an unsafety action. When an unsafety action is detected, it is easy to secure the safety of the first user by presenting the first notification to prompt the first user to take a safety action.

In the present modification, the unsafety action as the second condition is an action where "the first user is moving in a direction different from the direction of the first user", but the present disclosure is not limited thereto, and may be, for example, an action where "the first user runs near the road". In this case, in step S602, the control unit 16 may acquire information indicating the speed and the acceleration of the first user via the acquisition unit 12, in addition to the direction information and the position information. In step S603, the control unit 16 may determine whether the first user has started running based on the acquired information. The storage unit 15 may store, in the notification database, a voice of "stop running near the road" corresponding to the first notification for the above unsafety action.

Also, for example, in the embodiments described above, the first notification, the second notification, and the third notification are all presented in the form of a voice. However, an embodiment in which at least one of these notifications is presented in another form, for example, in the form of vibration, is also possible. In this case, as the data of the notification, data indicating the intensity or the vibration pattern of the vibration output from the output unit 13 may be stored in the notification data of the notification database. The intensity or the vibration pattern of the vibration may be set to vary depending on the distance D or the duration of the unsafety action. For example, the vibration may be set to be stronger as the distance D is shorter or as the duration of the unsafety action is longer. Further, when presenting two or more notifications of the first notification, the second notification, and the third notification in the form of vibration, the two or more notifications may be distinguished by changing the intensity or the vibration pattern of the vibration output from the output unit 13 for each notification. The setting for changing the presentation mode of the notification in this way is not limited to the notification by vibration, and can be applied to other notification forms as appropriate. This makes it easier to ensure the safety of the first user while allowing the first user to experience a change in the risk and/or distinguish between two or more notifications.

Further, for example, the control unit 16 of the terminal device 10 may transmit the history data to the smartphone of the second user via a local network such as a wireless LAN without passing through the network 30 in response to a request from the smartphone of the second user. In this case, the terminal device 10 of the first user and the smartphone of the second user directly transmit and receive data so that the second user can confirm the history of the movement route and the safety action of the first user.

Further, for example, in the embodiments described above, the configurations and the operations of the terminal device 10 may be distributed to a plurality of computers capable of communicating with each other.

Further, for example, an embodiment in which a part or all of the components of the terminal device 10 are provided in the arithmetic device 20 is also possible. For example, an embodiment in which a part or all of the operations executed by the terminal device 10 are executed by the arithmetic device 20 is also possible. In this case, the information processing device according to the present embodiment is the arithmetic device 20. For example, the arithmetic device 20 may further include a component corresponding to the acquisition unit 12 of the terminal device 10, and the control unit 23 of the arithmetic device 20 may execute a part or all of the operations of the control unit 16 of the terminal device 10. The control unit 23 of the arithmetic device 20 may execute operations other than the operations of presenting the first notification, the second notification, or the third notification via the output unit 13 of the terminal device 10 (i.e., step S105, step S405, step S408, step S412, step S505, step S508, step S513, or step S605). In this case, in step S104, step S404, step S407, step S411, step S504, step S507, step S512, or step S604, the control unit 23 of the arithmetic device 20 may transmit the first instruction, the second instruction, or the third instruction to the communication unit 11 of the terminal device 10 via the network 30. The control unit 16 of the terminal device 10 may transmit, to the output unit 13, the first instruction, the second instruction, or the third instruction received via the communication unit 11.

Further, an embodiment is also possible in which, for example, a general-purpose computer functions as the terminal device 10 according to the above embodiments. Specifically, a program describing processing contents for realizing each function of the terminal device 10 according to the above embodiments is stored in the memory of the general-purpose computer, and the program is read and executed by the processor. Therefore, the present disclosure can also be realized as a program that can be executed by the processor or a non-transitory computer-readable medium (storage medium) that stores the program.

What is claimed is:

1. An information processing device comprising a control unit, wherein:
   the control unit
   determines a moving method of a first user,
   outputs a first instruction to present a first notification for prompting the first user to perform a safety action, when both a first condition and a second condition are satisfied, and
   avoids outputting the first instruction when at least one of the first condition and the second condition is not satisfied; and
   the first condition is a condition that the first user is not on a passenger vehicle.

2. The information processing device according to claim 1, wherein:
   the second condition is a condition that the first user has approached at least one checkpoint of one or more checkpoints; and
   the control unit
   acquires position information of the first user, and
   determines, based on the position information, whether the first user has approached the at least one checkpoint of the one or more checkpoints.

3. The information processing device according to claim 2, wherein the one or more checkpoints include at least one of a first checkpoint that is set not based on an input of a second user different from the first user and a second checkpoint that is set based on an input of the second user.

4. The information processing device according to claim 2, wherein the control unit
   determines that the first user has approached the at least one checkpoint when a distance D between the at least one checkpoint and the first user becomes less than a threshold value Dth, and
   sets the threshold value Dth such that the threshold value Dth is longer when the moving method of the first user is a bicycle than when the moving method of the first user is walking.

5. The information processing device according to claim 2, wherein:
   the second condition is a condition that the first user is moving in a direction different from a direction of the first user; and
   the control unit
   acquires direction information indicating the direction of the first user, and
   determines whether the first user is moving in a direction different from the direction of the first user based on the position information and the direction information.

6. The information processing device according to claim 2, wherein the control unit
   outputs a second instruction for presenting a second notification different from the first notification when the safety action of the first user is detected after output of the first instruction, and
   outputs a third instruction for presenting a third notification different from the first notification and the second notification when the first user exits a peripheral area of the at least one checkpoint while the safety action is not detected after the output of the first instruction.

7. The information processing device according to claim 6, wherein the control unit
   outputs the third instruction when the first user exits the peripheral area while the safety action is not detected and road crossing has been performed by the first user in the peripheral area after the output of the first instruction, and
   avoids outputting the third instruction when the first user exits the peripheral area while the safety action is not detected and the road crossing has not been performed by the first user in the peripheral area after the output of the first instruction.

8. A method executed by an information processing device, the method comprising:
   determining a moving method of a first user;
   outputting a first instruction to present a first notification for prompting the first user to perform a safety action, when both a first condition and a second condition are satisfied; and
   avoiding outputting the first instruction when at least one of the first condition and the second condition is not satisfied, wherein the first condition is a condition that the first user is not on a passenger vehicle.

9. The method according to claim 8, wherein:
   the second condition is a condition that the first user has approached at least one checkpoint of one or more checkpoints; and
   the method further includes
   acquiring position information of the first user, and
   determining, based on the position information, whether the first user has approached the at least one checkpoint of the one or more checkpoints.

10. The method according to claim 9, wherein the one or more checkpoints include at least one of a first checkpoint that is set not based on an input of a second user different from the first user and a second checkpoint that is set based on an input of the second user.

11. The method according to claim 9, further comprising:
    determining that the first user has approached the at least one checkpoint when a distance D between the at least one checkpoint and the first user becomes less than a threshold value Dth; and
    setting the threshold value Dth such that the threshold value Dth is longer when the moving method of the first user is a bicycle than when the moving method of the first user is walking.

12. The method according to claim 9, wherein:
    the second condition is a condition that the first user is moving in a direction different from a direction of the first user; and
    the method further includes
    acquiring direction information indicating the direction of the first user, and determining whether the first user is moving in a direction different from the direction of the first user based on the position information and the direction information.

13. The method according to claim 9, further comprising:
outputting a second instruction for presenting a second notification different from the first notification when the safety action of the first user is detected after output of the first instruction; and
outputting a third instruction for presenting a third notification different from the first notification and the second notification when the first user exits a peripheral area of the at least one checkpoint while the safety action is not detected after the output of the first instruction.

14. The method according to claim 13, further comprising:
outputting the third instruction when the first user exits the peripheral area while the safety action is not detected and road crossing has been performed by the first user in the peripheral area after the output of the first instruction; and
avoiding outputting the third instruction when the first user exits the peripheral area while the safety action is not detected and the road crossing has not been performed by the first user in the peripheral area after the output of the first instruction.

15. A non-transitory storage medium storing a program causing an information processing device to execute:
determining a moving method of a first user;
outputting a first instruction to present a first notification for prompting the first user to perform a safety action, when both a first condition and a second condition are satisfied; and
avoiding outputting the first instruction when at least one of the first condition and the second condition is not satisfied, wherein the first condition is a condition that the first user is not on a passenger vehicle.

16. The non-transitory storage medium according to claim 15, wherein:
the second condition is a condition that the first user has approached at least one checkpoint of one or more checkpoints; and
the program causes the information processing device to further execute
acquiring position information of the first user, and
determining, based on the position information, whether the first user has approached the at least one checkpoint of the one or more checkpoints.

17. The non-transitory storage medium according to claim 16, wherein the one or more checkpoints include at least one of a first checkpoint that is set not based on an input of a second user different from the first user and a second checkpoint that is set based on an input of the second user.

18. The non-transitory storage medium according to claim 16, wherein the program causes the information processing device to further execute:
determining that the first user has approached the at least one checkpoint when a distance $D$ between the at least one checkpoint and the first user becomes less than a threshold value $D_{th}$; and
setting the threshold value $D_{th}$ such that the threshold value $D_{th}$ is longer when the moving method of the first user is a bicycle than when the moving method of the first user is walking.

19. The non-transitory storage medium according to claim 16, wherein:
the second condition is a condition that the first user is moving in a direction different from a direction of the first user; and
the program causes the information processing device to further execute
acquiring direction information indicating the direction of the first user, and
determining whether the first user is moving in a direction different from the direction of the first user based on the position information and the direction information.

20. The non-transitory storage medium according to claim 16, wherein the program causes the information processing device to further execute:
outputting a second instruction for presenting a second notification different from the first notification when the safety action of the first user is detected after output of the first instruction; and
outputting a third instruction for presenting a third notification different from the first notification and the second notification when the first user exits a peripheral area of the at least one checkpoint while the safety action is not detected after the output of the first instruction.

* * * * *